United States Patent
Guarnieri et al.

(10) Patent No.: US 11,745,902 B1
(45) Date of Patent: Sep. 5, 2023

(54) SYSTEMS, METHODS AND APPARATUS FOR MULTIFUNCTIONAL CENTRAL PATTERN GENERATOR

(71) Applicant: Government of the United States of America as represented by the Secretary of the Air Force, Kirtland AFB, NM (US)

(72) Inventors: Jason Guarnieri, Rio Rancho, NM (US); John Thurman, Albuquerque, NM (US); Jeremy Wojcik, Albuquerque, NM (US)

(73) Assignee: Government of the United States as represented by the Secretary of the Air Force, Kirtland AFB, NM (US)

( * ) Notice: Subject to any disclaimer, the term of this patent is extended or adjusted under 35 U.S.C. 154(b) by 758 days.

(21) Appl. No.: 16/710,172

(22) Filed: Dec. 11, 2019

(51) Int. Cl.
| | |
|---|---|
| *B64G 1/56* | (2006.01) |
| *B64G 1/68* | (2006.01) |
| *B64G 1/24* | (2006.01) |
| *B64G 1/28* | (2006.01) |
| *B64G 1/10* | (2006.01) |
| *G06N 3/04* | (2023.01) |
| *B64G 1/00* | (2006.01) |
| *G06N 3/049* | (2023.01) |

(52) U.S. Cl.
CPC ............ *B64G 1/56* (2013.01); *B64G 1/10* (2013.01); *B64G 1/242* (2013.01); *B64G 1/28* (2013.01); *B64G 1/68* (2013.01); *G06N 3/049* (2013.01); *B64G 1/002* (2013.01)

(58) Field of Classification Search
CPC . B64G 1/56; B64G 1/10; B64G 1/242; B64G 1/28; B64G 1/68; B64G 1/002; G06N 3/049
See application file for complete search history.

(56) References Cited

U.S. PATENT DOCUMENTS

| | | | |
|---|---|---|---|
| 7,145,305 B2 | 12/2006 | Takenaka et al. | |
| 7,313,463 B2 | 12/2007 | Herr et al. | |
| 7,822,694 B2 | 10/2010 | Llinas et al. | |
| 7,870,086 B2 | 1/2011 | Llinas et al. | |
| 9,144,681 B2 * | 9/2015 | Decre | A61N 1/36139 |
| 9,599,994 B1 * | 3/2017 | Bogdanowicz | G08G 5/045 |
| 10,395,117 B1 * | 8/2019 | Zhang | G01C 21/206 |

(Continued)

OTHER PUBLICATIONS

Renke He, Wei & Qirui Zhang UAV autonomous collision avoidance approach Automatika—Journal for Control, Measurement, Electronics, Computing and Communications ISSN: 0005-1144 (Print) 1848-3380 (Online) Journal homepage: https://www.tandfonline.com/loi/taut20 (Year: 2017).*

(Continued)

*Primary Examiner* — Donald J Wallace
*Assistant Examiner* — Jalal C Coduroglu
(74) *Attorney, Agent, or Firm* — David L. Narciso; AFNWC/JA (57) ABSTRACT

Systems, methods and apparatus related to a self-preservation/self-protection system (SPS). The SPS system includes a local area situation awareness sensor suite (LASASS), multiple central pattern generator (mCPG) decision circuitries and related actuators. The SPS system utilizes the LASASS, mCPG circuitries and actuators to perform the desired processing and effectuate changes in the position of an object to be detected or avoided.

26 Claims, 7 Drawing Sheets

(56) References Cited

U.S. PATENT DOCUMENTS

| | | | | |
|---|---|---|---|---|
| 2004/0075473 | A1* | 4/2004 | Llinas | G06N 3/049 703/11 |
| 2005/0113973 | A1* | 5/2005 | Endo | B62D 57/032 700/245 |
| 2005/0239457 | A1* | 10/2005 | Levin | H04B 7/18508 455/12.1 |
| 2006/0016934 | A1* | 1/2006 | Sharer | B64G 1/007 244/158.4 |
| 2009/0049220 | A1* | 2/2009 | Conti | G06F 13/24 710/267 |
| 2009/0308668 | A1 | 12/2009 | Roh et al. | |
| 2011/0029130 | A1 | 2/2011 | Goswami et al. | |
| 2011/0029471 | A1 | 2/2011 | Chakradhar et al. | |
| 2011/0178639 | A1* | 7/2011 | Kwon | B62D 57/032 901/1 |
| 2016/0011318 | A1* | 1/2016 | Cohen | G01S 19/42 342/357.68 |
| 2016/0375768 | A1* | 12/2016 | Konet | G08G 1/166 348/148 |
| 2019/0236732 | A1* | 8/2019 | Speasl | G01C 21/206 |
| 2019/0372669 | A1* | 12/2019 | Ziegler | H04B 10/503 |
| 2020/0294401 | A1* | 9/2020 | Kerecsen | G05D 1/0287 |
| 2020/0334961 | A1* | 10/2020 | Kaindl | B60Q 1/24 |

OTHER PUBLICATIONS

Barron-Zambrano, Jose & Torres-Huitzil, Cesar & Girau, Bernard. (2015). Perception-driven adaptive CPG-based locomotion for hexapod robots. Neurocomputing. 170. 10.1016/j.neucom.2015.02.087.

Elices, Irene & Varona, Pablo. (2015). Closed-loop control of a minimal central pattern generator network. Neurocomputing. 170. 10.1016/j.neucom.2015.04.097.

Ferreira, Cesar and Cristina P. Santos. "Combining central pattern generators and reflexes." Neurocomputing 170 (2015): 79-91.

Guerra-Hernandez, Erick & Espinal, Andres & Batres-Mendoza, Patricia & Garcia-Capulin, Carlos & Romero-Troncoso, René & Rostro-Gonzalez, Horacio. (2017). A FPGA-Based Neuromorphic Locomotion System for Multi-Legged Robots. IEEE Access. pp. 1-1. 10.1109/access.2017.2696985.

Ijspeert, A.J. & Crespi, Alessandro & Ryczko, Dimitri & Cabelguen, jean-marie. (2007). From Swimming to Walking with a Salamander Robot Driven by a Spinal Cord Model. Science (New York, N.Y.). 315. 1416-20. 10.1126/science.1138353.

Ijspeert, A.J . . . (2008). Central pattern generators for locomotion control in animals and robots: a review. Neural Networks. 21.

Liu, Guang & Habib, Maki & Watanabe, Keigo & Izumi, Kiyotaka. (2007). The Design of Central Pattern Generators Based on the Matsuoka Oscillator to Generate Rhythmic Human-Like Movement for Biped Robots . . . JACIII. 11. 946-955.

Michael Sorensen, Stephen DeWeerth, Gennady Cymbalyuk, Ronald L. Calabrese, "Using a Hybrid Neural System to Reveal Regulation of Neuronal Network Activity by an Intrinsic Current," Journal of Neuroscience Jun. 9, 2004, 24 (23) 5427-5438; DOI: 10.1523/jneurosci.4449-03.2004.

Principe, Jose & Wang, Ludong & Motter, Mark. (2000). Local Dynamic Modeling with Self-Organizing Maps and Applications to Nonlinear System Identification and Control. Proceedings of the IEEE. 86. 10.1109/5.726789.

Staffa, Mariacarla, Domenico Perfetto and Silvia Rossi. "Engineering central pattern generated behaviors for the deployment of robotic systems." Neurocomputing 170 (2015): 98-112.

Wojcik J, Schwabedal J, Clewley R, Shilnikov AL (2014) Key Bifurcations of Bursting Polyrhythms in 3-Cell Central Pattern Generators. PLOS ONE 9(4): e92918. https://doi.org/10.1371/journal.pone.0092918.

Wojcik, Jeremy, Robert Clewley and Andrey L. Shilnikov. "Order parameter for bursting polyrhythms in multifunctional central pattern generators." Physical review. E, Statistical, nonlinear, and soft matter physics 83 5 Pt 2 (2011): 056209.

* cited by examiner

SYSTEMS, METHODS AND APPARATUS FOR MULTIFUNCTIONAL CENTRAL PATTERN GENERATOR

STATEMENT OF GOVERNMENT INTEREST

The embodiments described herein may be manufactured and used by or for the Government of the United States for all governmental purposes without the payment of any royalty.

FIELD OF THE DISCLOSURE

The present disclosure relates to a neural network that utilizes multifunctional Central Pattern Generators (mCPG) to achieve dynamic control of complex systems.

BACKGROUND

Central Pattern Generators (CPGs) are a functional element of the central nervous system and are responsible for the control and initiation of movements. They are located in the spinal cord and in the brain stem. CPGs are neural networks that endogenously, i.e. without external stimuli, generate rhythmically repeating patterns by the involved neurons "firing". The "firing" of a neuron means generation of a short, electric pulse in which signals are transmitted to the neurons connected to the firing neuron. A CPG is composed of a plurality of neural networks, in which the neurons within each neural network have specific phase relationships.

BRIEF SUMMARY

Embodiments described herein are directed to systems, methods and apparatus utilizing CPGs and the application of mCPGs to an autonomous, self-aware, self-preservation system for satellites. Embodiments described herein are related to central pattern generators (CPGs) and the application of mCPGs to an autonomous, self-aware apparatus or system. The disclosed embodiments utilize electro-mechanical systems in conjunction with mCPGs.

One embodiment is a self-protection system for a spacecraft in an extraterrestrial orbit. The system includes local area situational awareness sensors (LASS) configured to acquire sensory data relative to a designated region surrounding the spacecraft. A controller has multifunctional central pattern generator (mCPG) circuits configured to receive the sensory data acquired by the one or more local area situational awareness sensors. The controller also has a data handler circuit and a guidance control circuit, which are in communication with the mCPG circuits. The controller is configured to operatively switch between one or more of the mCPG circuits.

The navigation sensors are configured to acquire navigation data relative to the spacecraft and provide the acquired navigation data to the guidance control circuit and the mCPG circuits. The mCPG circuits generate a related pattern control signal.

The actuators are configured to receive one or more guidance control signals from the guidance control circuit and one or more pattern control signals from the mCPG circuits to actuate mechanisms of the spacecraft to adjust a position of the spacecraft based at least in part on the received guidance control signals from the guidance control circuit and based at least on a larger part on the pattern control signals from the mCPG circuits.

BRIEF DESCRIPTION OF THE DRAWINGS

The accompanying drawings, which are incorporated in and constitute a part of this specification, illustrate embodiments of the present disclosure and, together with a general description given above, and the detailed description given below, serve to explain the principles of the present disclosure.

It should be understood that the appended drawings are not necessarily to scale, presenting a somewhat simplified representation of various features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The present disclosure will now be described more fully hereinafter with reference to the accompanying drawings, in which preferred embodiments are shown. This disclosure may, however, be embodied in many different forms and should not be construed as limited to the embodiments set forth herein. Rather, these embodiments are provided so that this disclosure will be thorough and complete, and will fully convey the scope to those skilled in the art. All of the embodiments described herein are combinable with every other embodiment described herein.

Typically, space domain awareness (SDA) data is obtained from a variety of sources to include space, air, and ground sensors. That data is processed on the ground and eventually is pushed out to the spacecraft operators. The operators then evaluate the data and decide if there is a danger to their spacecraft. By the time this process is complete it is too late to avoid the threat and the spacecraft is damaged or destroyed. Typical timelines are days to weeks with this process.

The disclosed system collects its own SDA data making it self-aware and eliminating the dangerous (possibly fatal) information time lag in current systems.

The present disclosure relates to Multifunctional Central Pattern Generators (mCPGs), which may be described in terms of small biological neural networks found in vertebrates that control rhythmic motor patterns including breathing, walking, flying, and swimming. CPGs function in the absence of external sensor inputs but can integrate sensory feedback enabling adaptation. CPGs have been explored for use in walking, flying, and swimming robots. Examples of a CPG-based robot include a salamander-like robot that transitions from walking to swimming, Boston Dynamics BigDog rough-terrain robot and the more advanced Atlas humanoid robot. Presently, there are no automatic electromechanical systems to switch between walking and swimming so the systems described above manually switch between ambulatory modes.

This switching shortfall is normally remedied in software and requires an external human input to command a change in behavior. The Neuromimetic Control System (NCS) leverages biological network bifurcation theory to produce mCPGs that are capable of switching between states based on sensory inputs and without human interaction, analogous to a biological nervous system.

Embodiments of this disclosure relate to the automatic electromechanical system for switching between CPGs and an application of mCPGs to an autonomous, self-aware, self-preservation system, such as applicable to satellites, self-driving automobiles and prosthetic limbs for humans and animals.

Convolutional neural networks may be used for nonlinear control of robotic locomotion. Typically, neural networks that are employed are modeled in software, and are based on dedicated CPGs. A dedicated CPG has a single stable rhythmic output. Dedicated CPGs do not allow switching of rhythmic behaviors based on sensory inputs. In the case of the salamander robot, two sets of dedicated CPGs are employed. The first set produces the rhythmic CPG for walking while another set of dedicated CPGs are used only for swimming. There is no automatic mechanism present to switch between walking and swimming in the salamander. That is, there is no self-contained switching mechanism that allows for switching between CPGs. That shortfall is normally remedied in software and requires an external human input to command a change in behavior.

The Neuromimetic Control System leverages biological network bifurcation theory to produce mCPGs that are capable of switching between states based on sensory inputs and without human interaction, analogous to a biological nervous system. The use of mCPGs allows for a system to be controlled by leveraging analog circuitry, software defined control methodology, or a hybrid approach that combines the analog and software solutions. This novel approach is a departure from current methodology by mimicking a vertebrate nervous system. Many computational burdens typically found in robotic controls could be replaced by integration of action potentials, voltages, from sensory inputs.

A neuromimetic control system can be realized using analog circuitry similar to biological neurons. An analog approach increases resilience to noise, bit flips, race conditions, and other problems that use software-based control. The digital/analog hybrid approach would be susceptible to the issues described above for the digital portion of the implementation but not the entire control mechanism.

The neuromimetic control system can be layered similar to the spinal cord in a vertebrate, which can have multiple layers of mCPGs used for various levels of control. The different layers can interact with each other and produce increasingly complex behaviors or integrate new sensory inputs into already established behaviors.

This disclosed novel technology replaces any dynamic system controlled by a software control flow and also allows complex systems to function with much smaller computing resources necessary. This technology fuels miniaturization efforts by relieving the requirement for high powered computers and complex software. The computers are typically micro-processor computing devices as known in the art and may include state-of-the-art computers and/or processing devices. These computers may also have artificial intelligence (AI) capabilities or functionality.

The present disclosure describes a bottom-up designed neural network that utilizes multifunction Central Pattern Generators (mCPG) to achieve dynamic control of complex systems while reducing the computational requirements and loads. This technology addresses miniaturization challenges that have not been addressed because of the necessity of bulky computers. Current technology utilizes Proportional Integral Derivative (PID) controllers, and software defined computational neural networks requiring substantial computing resources and learning datasets to validate the models. Embodiments described herein offload lower level functional computation to the mCPGs reducing the computational loading on the microprocessors. In addition, layering mCPGs substantially reduces the computational burdens.

As described herein, mCPGs may be utilized in the spacecraft Self-Preservation System (SPS). The SPS consistently monitors sensory inputs from the environment surrounding the spacecraft and interrupts the standard spacecraft Guidance, Navigation and Control (GNC) functions only when the vehicle safety is at risk. Typically, spacecraft operators manage the vehicle orbits from the ground relying on external data for conjunction analysis, collision avoidance, space weather environment, etc. This man-in-the-loop command and control (C2) and communications latency between the operators and the vehicle leave valuable spacecraft unnecessarily vulnerable. Biological-based synthetic nervous systems based on mCPGs enable autonomous self-preservation maneuvers without increasing on-board processing requirements and are inherently cyber-hardened since the system is implemented completely in circuitry and there is no vulnerable software to hack.

Figure 1:
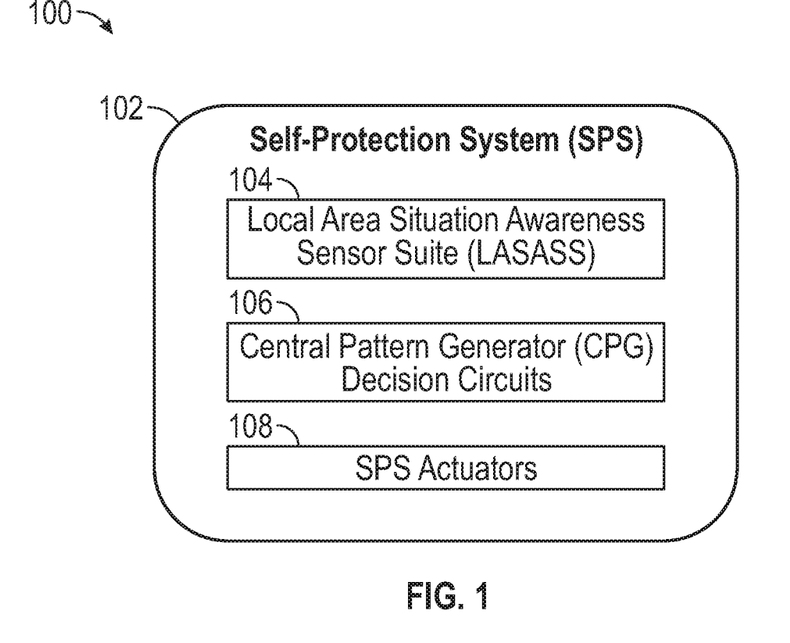
FIG. 1 shows a representation of a self-preservation/self-protection system (SPS) according to an embodiment of the disclosure.

FIG. 1 shows a representation 100 of a self-preservation/self-protection system (SPS) 102 according to an embodiment of the disclosure. The Self-Preservation System (SPS) 102 is comprised of three basic functional elements: Local Area Situational Awareness Sensor Suite (LASASS) 104, Multifunctional Central Pattern Generator (mCPG) decision circuits 106, and the SPS actuators 108. The LASASS 104 includes a variety of sensor including cameras (from ultraviolet to longwave infrared), RADAR, LIDAR, space weather instruments, gas chromatograph, mass spectrometer, infrared spectrophotometer, etc. The SPS actuators 108 augment the existing spacecraft actuators as desired and include propulsion, reaction wheels, and other attitude and obit control subsystems. LASASS 104 is the "eyes and ears" of the SPS 102 and the CPG decision circuits 106 are the brain, and the actuators 108 are the "arms and legs".

The SPS 102 utilizes the components 104, 106 and 108 to perform the desired processing and effectuate change in position via the actuators 108. Typically, the desired processing is based on the sensor suite 104 sensing data and sending the sensed data to the CPG circuitry 106. The CPG circuitry 106 generates control signals that are transmitted to the SPS actuators 108.

The SPS 102 is distributed throughout the spacecraft. The CPG decision circuits 106 are located on circuit cards hosted within the spacecraft flight computer. The sensors that make up the LASASS 104 are mounted on the various points around the spacecraft similar to the spacecraft guidance and navigation sensors. The SPS 102 will use actuators available on the spacecraft (e.g. torque rods & reaction wheels) and augment as necessary (e.g. propulsion).

Components, functions, and connectivity is typical of a spacecraft. The spacecraft flight computer manages the command and data handling (CDH) and Guidance, Navigation, and Control (GNC) tasks. Both the CDH and the GNC functions communicate with the SPS. GNC functions in the typical manner receiving inputs from the navigation sensors (e.g. Global Positioning System and Star Trackers) and adjusting the spacecraft in an orbit, or trajectory, and attitude through the control actuators (e.g. reaction wheels and propulsion). The SPS 102 receives inputs from both the navigation sensors and the LASASS 104. When these sensor data indicate a dangerous change in the environment (i.e. inbound meteoroid) the CPG decision circuits 106 trigger the SPS 102 to override the GNC system execute the self-protection maneuver (SPM). This occurs without spacecraft operator intervention.

SPMs can be pre-programmed or calculated in real-time, but it is expected that the SPS will have several pre-programmed SPMs from which the CPG decision circuits 106 will choose to execute.

Figure 2:
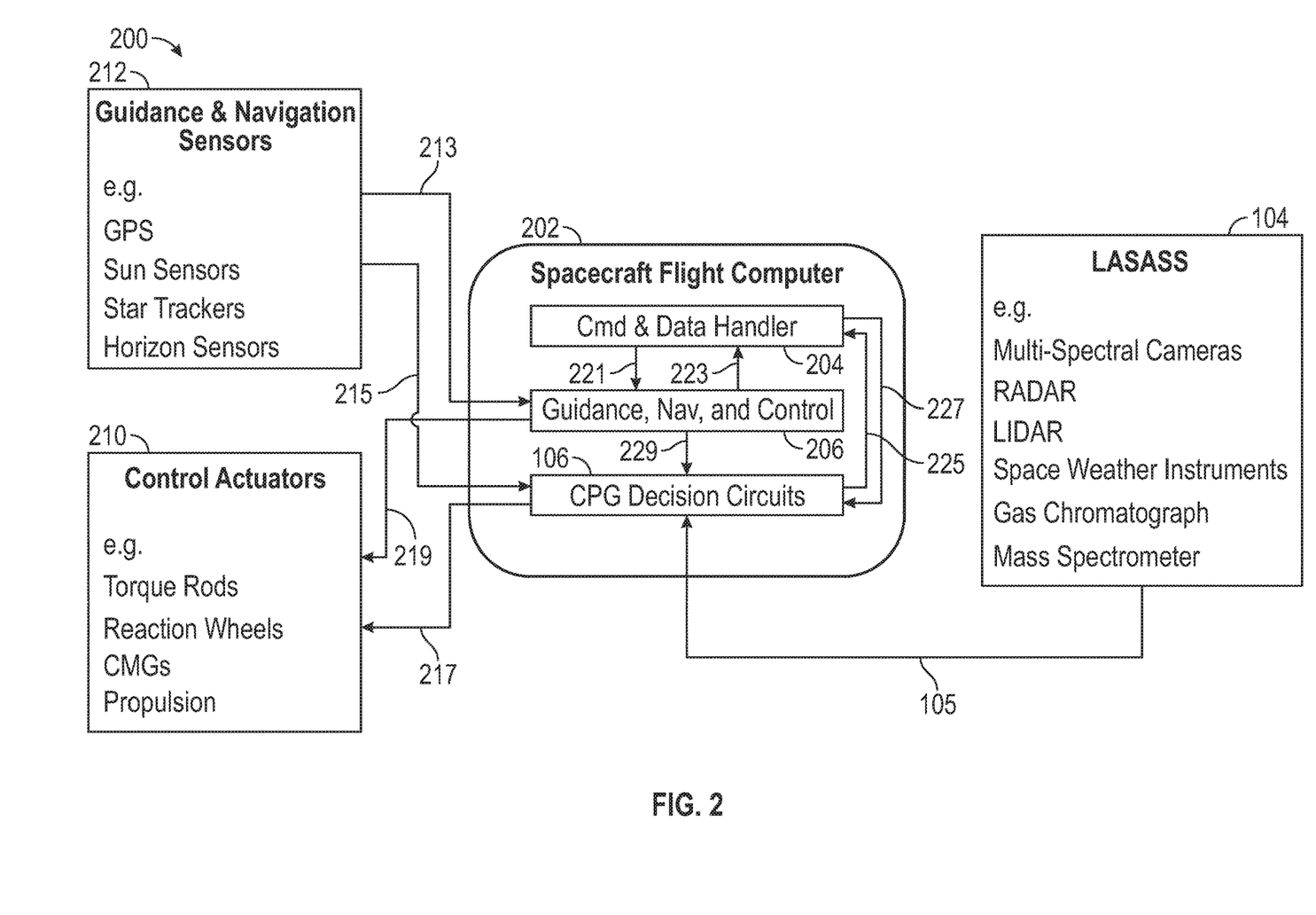
FIG. 2 shows a functional block diagram of an SPS according to another embodiment of the disclosure.

FIG. 2 shows representation 200 of a functional block diagram of an SPS according to another embodiment of the disclosure.

The representation 200 includes a flight computer 202, LASASS (local area situational awareness sensor suite) 104, guidance and navigation sensors 212 and control actuators 210.

The flight computer 202 is typically a computing device with adequate storage and processing capacity for the desired function. The flight computer 202 includes a command and data handler 204, a guidance, navigational and control module 206 and CPG decision circuits 106. Each of these may be modules, or memory locations, or self-contained computer program code stored on a non-transitory, non-volatile computer or electronic storage medium.

The command and data handler is configured to receive and process data from the guidance, navigation and control module 206, shown by line 223 and the CPG decision circuits 106, shown by line 225. The command and data handler module 204 also provides output to the guidance, navigation and control circuit 206, shown by line 221 and provides output to CPG decision circuits 106, shown by line 227.

The guidance, navigation and control module 206 receives data from guidance and navigation sensors 212, as shown by 213. The guidance navigation and control module 206 provides output to CPG decision circuits 106, shown by line 229 as well as provide output to control actuators 210, as shown by line 219.

The CPG decision circuit module 106 receives data from guidance and navigation sensors 212, as shown by line 215; guidance navigation and control module 206, as shown by line 229; and LASASS 104, as shown by line 105. The CPG decision circuit 106 provides output to control actuators 210, as shown by line 217. The CPG decision circuit module 106 has multiple layers, as described herein.

The LASASS circuitry 104 provides signals to the CPG decision circuitry 106, as shown by line 105.

The LASASS module, or circuitry, 104 typically includes multi-spectral cameras, RADAR, LIDAR, space weather instruments, gas chromatographs, mass spectrometers, and other suitable sensory devices adapted to obtain sensed data about the object to which the sensors are attached as well as sensed data related to an environment or surrounding area of the sensors. This may include satellites, spacecraft, cars, other objects etc. These other objects may be any object based on the environment of the sensors. If the sensors are attached to an automobile, the sensors would detect relevant data to that environment. If the sensors are placed on a prosthetic appendage, the sensed data would relate to a surrounding area of the prosthetic appendage.

The guidance and navigation sensors module, or circuitry, 212 includes sensors, such as GPS (global positioning satellite) sensors, sun sensors, star trackers, horizon sensors and other suitable sensors to sense external data.

Control actuators 210 include, for example, torque rods, reaction wheels, CMGs and propulsion devices. The control actuators 210 as shown in FIG. 2 are separate from the SPS actuators shown in FIG. 1 (shown as element 108 in FIG. 1).

Arrows 221 and 223 show communication and exchange of data and information between command and data handler 204 and guidance, navigational and control (GNC) module 206 and arrows 225 and 227 show exchange of information and data between command and data handler 204 and CPG decision circuits 106. The guidance navigational and control module 206 is adapted to transmit signals to CPG decision circuits 106, as shown by line 229.

The CPG decision circuitry 106 provides signals to the control actuators 210, as shown by line 217 and receives signals from the guidance and navigation sensors 212, as shown by line 215. For a satellite attitude control circuit, such as reaction wheel control, the system would dynamically determine the torques required by each wheel. These may be determined between 0.0 and 1.0, including any real number in that range. For example, the x-axis wheel should produce full torque (weighted as 1.0), the y-axis wheel should produce half torque (weighted as 0.5), and the z-axis wheel should produce no torque (weighted as 0.0). Similarly, for a temperature sensing circuit, there may be a group of thermal sensors that are less trusted than the rest of the thermal sensors. The system would dynamically assign weighting values to these sensors. For example, the less trusted sensors would be weighted as 0.2 where the completely trusted sensors remain weighted as 1.0. The weighting assignments may be adjusted in real time. The real time adjustment is based, at least in part, on the level of confidence of the sensor.

Thus, an embodiment is directed to the self-protection system for a spacecraft, where the guidance control signals from the guidance control circuit are weighted at between 0.0 and 1.0, including any real number in that range, and one or more pattern control signals from the mCPG circuits are weighted between 0.0 and 1.0, including any real number in that range, to adjust a position of the spacecraft.

The guidance, navigation and control circuits 206 provide signals to the control actuators 210, as shown by line 219, and receives signals from the guidance and navigation sensors 212, as shown by line 213.

Figure 3:
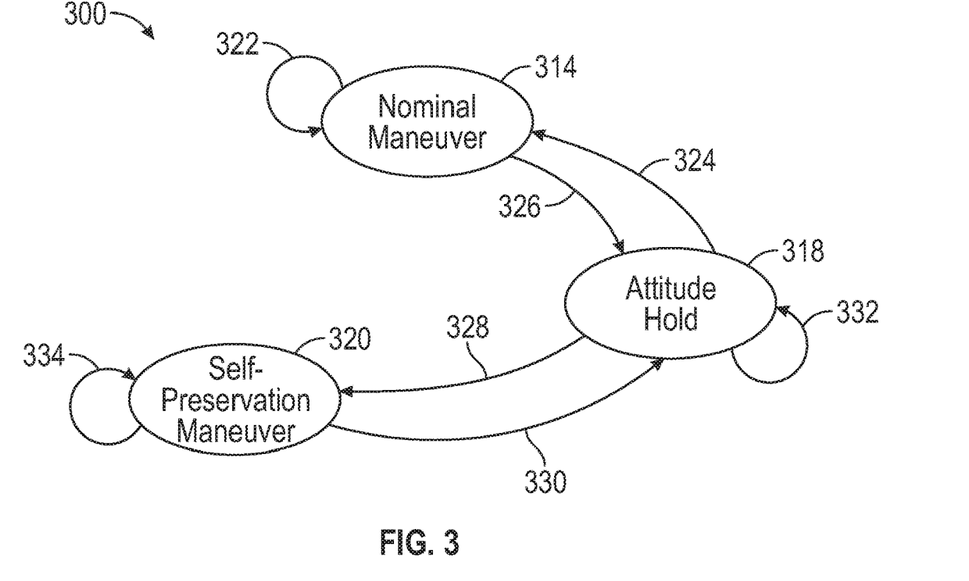
FIG. 3 shows a representation of state transitions according to yet another embodiment of the disclosure.

FIG. 3 shows a representation 300 of state transitions according to yet another embodiment of the disclosure. The various state transitions are shown to include an attitude hold 318, nominal maneuver 314 and self-preservation maneuver 320. The attitude hold pattern 318 has a loop pattern 332. The nominal maneuver 314 has a loop pattern 322 and the self-preservation maneuver 320 has a loop pattern 334.

The patterns illustrated (attitude hold, nominal maneuver, and self-preservation maneuver) can be modified, or changed, as shown by arrows 324, 326, 328 and 330. The changes in state are due to actuator movement to modify the orbit, or trajectory, of the object. In the attitude hold pattern 318, the sensors, as described herein, are in a status quo position. The object, such as a spacecraft is in a "hold", which means no unplanned action or motion is taken. Received input from the sensors, as described herein, causes the pattern to change, based, at least in part, on the received sensor data. The change in pattern may be any change that is possible for the object. In the example provided herein, the object may be a spacecraft and the change in motion may be either a nominal maneuver 314 or a self-preservation maneuver 320. The nominal maneuver 314 may be less drastic and less abrupt than a self-preservation maneuver 320, which may involve more drastic changes in motion. While this is an example, it should be understood that other changes are within the scope of this disclosure.

For example, as shown in FIG. 3, the attitude hold 318 can transition to a nominal maneuver 314, as shown by 324. The nominal maneuver 314 can hold that pattern, as shown by 322. The nominal maneuver 314 can revert to the attitude hold 318, as shown by line 326.

Alternatively, the attitude hold 318 can transition to a self-preservation maneuver 320, as shown by 328. The self-preservation maneuver 320 can hold that pattern, as shown by 334. The self-preservation maneuver 320 can revert to the attitude hold 318, as shown by line 330.

Figure 4:
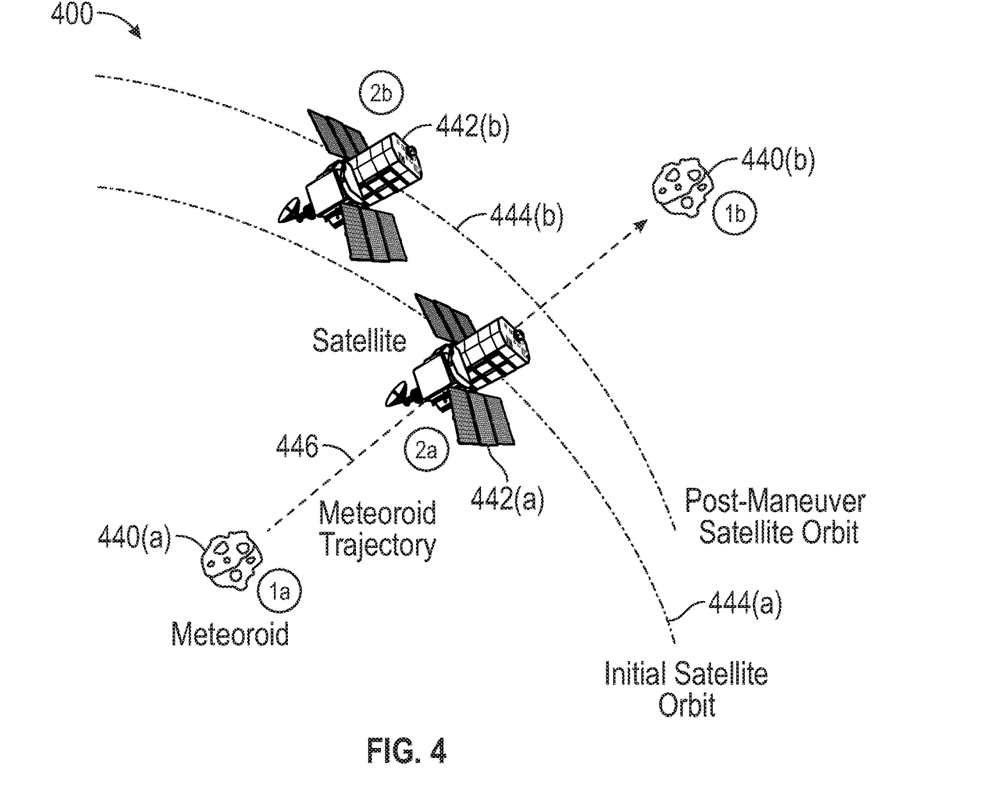
FIG. 4 shows a representation of an orbit adjustment according to yet another embodiment of the disclosure.

FIG. 4 shows a representation 400 of an orbit adjustment according to yet another embodiment of the disclosure. As shown in FIG. 4, representation 400 shows a scenario in which an autonomous spacecraft adjusts its orbit to avoid an incoming meteoroid, where the spacecraft detects the incoming meteoroid using the on-board Local Area Situational Awareness Sensor Suite (LASASS), as described herein. The CPG-based self-aware Self-Preservation System (SPS) autonomously executes the orbit adjust self-preservation maneuver (SPM) allowing the meteoroid to travel past without collision.

Without the SPS the spacecraft would be hit by the meteoroid, since it is not detectable by the traditional ground-based or space-based SSA sensors due to its small size. Depending on the size and relative velocity of the meteoroid, the spacecraft would be damaged or destroyed.

As shown in FIG. 4, a meteoroid 440, having a first position 440(a) and a second position 440(b) has a meteoroid trajectory 446. The meteoroid trajectory 446 is in the path of satellite 442, when in first position 442(a) in initial satellite orbit 444(a). The meteoroid 440 may be of a size and/or mass that prevents the meteoroid 440 from being detected using terrestrial data gathering.

The satellite 442 changes from the initial satellite orbit 444(a) to a post-maneuver satellite orbit 444(b), which is shown as satellite position 442(b). The meteoroid 440(b) did not impact or collide with the satellite 442, since the satellite 442(b) is in another orbit 444(b). This illustrates that the satellite 442 is configured to sense the trajectory of the meteoroid, using sensors as described herein, and perform a maneuver, using the mCPGs and actuators, as described herein. The sensors provide sensor data regarding the meteoroid and the mCPGs receive the sensor data and autonomously control the actuators to adjust the orbit of the satellite 442.

Figure 5A:
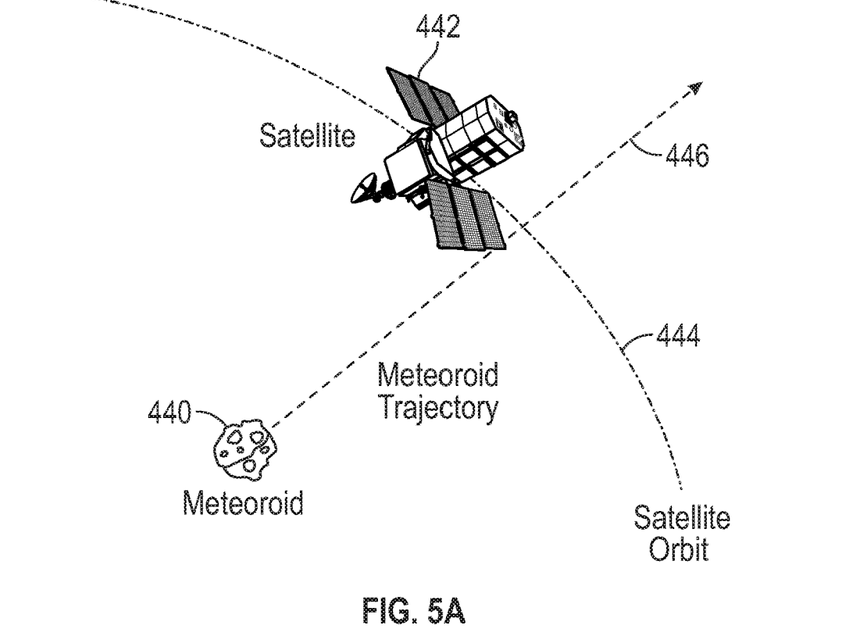
FIGS. 5A and 5B show a representation of an example of attitude adjustment of satellites according to yet another embodiment of the disclosure.
Figure 5B:
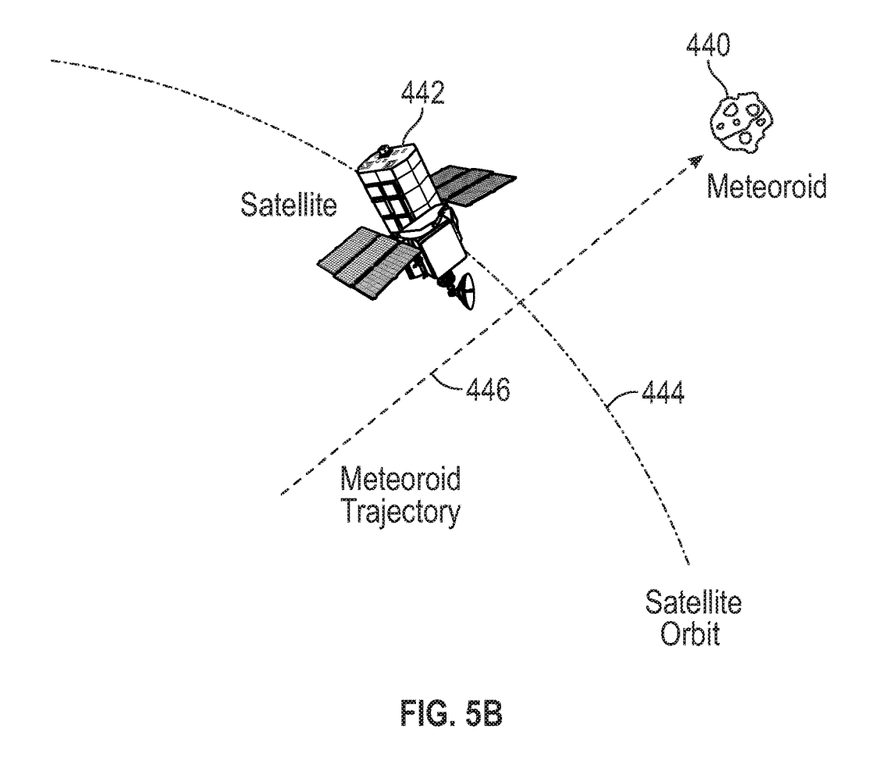

FIGS. 5A and 5B show a representation of an example of attitude adjustment of satellites according to yet another embodiment of the disclosure. FIGS. 5A and 5B show a scenario where a spacecraft detects an incoming meteoroid (FIG. 5A). In this case the SPS executes an attitude-adjust SPM (self-preservation maneuver) (FIG. 5B).

As shown in FIG. 5A, satellite 442 is in orbit 444 that intersects with meteoroid trajectory 446 of meteoroid 440. As shown in FIG. 5A, a portion of the satellite 442 is in a collision path of meteoroid 440.

FIG. 5B shows that the satellite 442 has changed its orientation in the same orbit 444 such that no portion of the satellite 442 is intersecting with the meteoroid trajectory 446 of meteoroid 440. This change in orientation of the satellite 442 is achieved by actuating actuators, as described herein, to modify the attitude of the satellite. The sensors provide sensor data regarding the trajectory 446 of meteoroid 440 and the mCPGs receive the sensor data and autonomously control the actuators to adjust the orientation of the satellite 442 in orbit 444. Thus, the scenario of FIGS. 5A and 5B shows that the orbit 444 of the satellite 442 is not changed. The actuators of the satellite 442 are adequate to modify the orientation of the satellite 442 to be outside the trajectory 446 of meteoroid 440. This change is made independent of human intervention and is accomplished by the mCPGs receiving sensor data and controlling actuators. The change is a self-preservation move that prevents the satellite from deleteriously interacting with another object.

Figure 6:
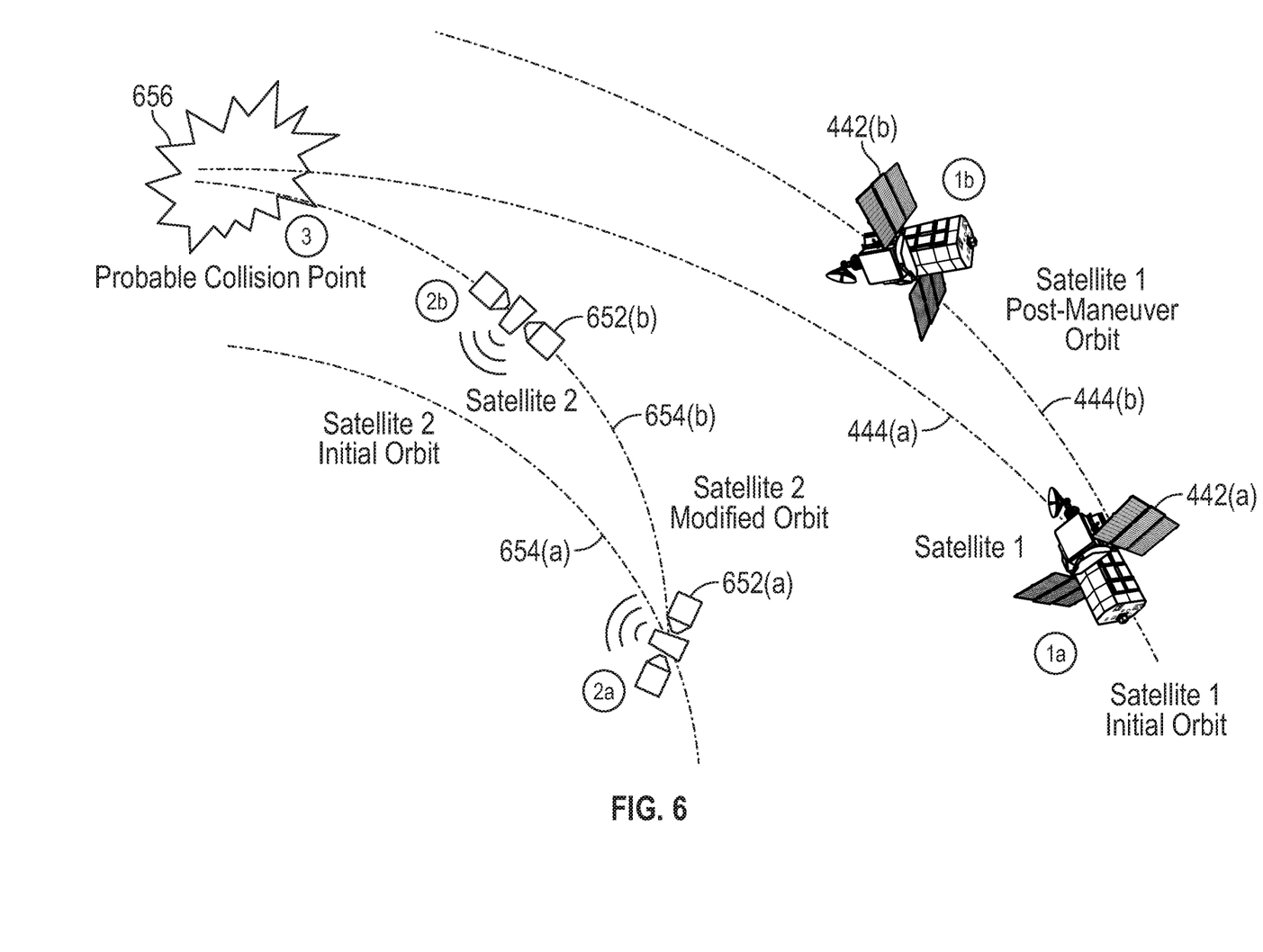
FIG. 6 shows a representation of an example of intersecting orbits according to yet another embodiment of the disclosure.

FIG. 6 shows a representation 600 of an example of intersecting orbits according to yet another embodiment of the disclosure. As shown in FIG. 6, the representation 600 shows a scenario where two satellites' orbits intersect and there is a high probability of collision if both satellites continue on their current trajectories. In this scenario the traditional conjunction analysis methods failed to detect the risk of collision because satellite 652 recently maneuvered from position 652(a) in first trajectory 654(a) to position 652(b) in trajectory 654(b), which put it in a conjunction with satellite 442 in orbit 444(a). Satellite 442, equipped with the SPS (self-preservation system), evaluates the probability of collision with satellite 652, which is now in orbit 654(b) and autonomously executes an orbit adjust SPM (self-preservation maneuver) avoiding the collision by changing the orbit of satellite 442 from trajectory 444(a) to trajectory 444(b).

The intersecting orbits 444(a) and 652(b) have a probable collision point 656 because satellite 652 modified from first trajectory 654(a) to trajectory 654(b). As will be described in more detail in relation to FIG. 6, a first satellite 442 autonomously executes orbit and attitude adjust maneuvers to avoid a collision with second satellite 652.

As shown in FIG. 6, a first satellite (generally 442) is in a first position in a first orbit 444(a), shown as satellite 442(a). (Satellite is shown as 442(a) in first orbit 444(a)). Satellite orbit 444(a) is shown as having a probable collision with a second satellite (generally 652) shown as having a first position 652(a) in second orbit 654(b), which is different than the previous orbit 654(a) of satellite 652. Satellite 652 had modified its orbit such that satellite 652 tracks orbit 654(b), as shown by 652(b). After the adjustment by satellite 652, from initial orbit 654(a), to modified orbit 654(b), the trajectory of satellite 652 in position 652(b) will likely collide with satellite 442, in position 442(a) in orbit 444(a) at a location 656.

This is significant because initially satellite 652, while in trajectory 654(*a*), would not have been on a collision path with satellite 442 while satellite 442 was in orbit 444(*a*). However, the adjustment in orbit, or trajectory, of satellite 652 causes a potential collision with satellite 442. Satellite 442 takes self-preservation action by a self-preservation maneuver.

Satellite 442 adjusts its trajectory to move from orbit 444(*a*) to a post maneuver orbit, or trajectory, 444(*b*), which places the satellite 442 into position 442(*b*). Thus, the modified orbit 654(*b*) of satellite 652 is no longer on a probable collision path with satellite 442, which is now shown as in position 442(*b*) in orbit 444(*b*).

Figure 7:
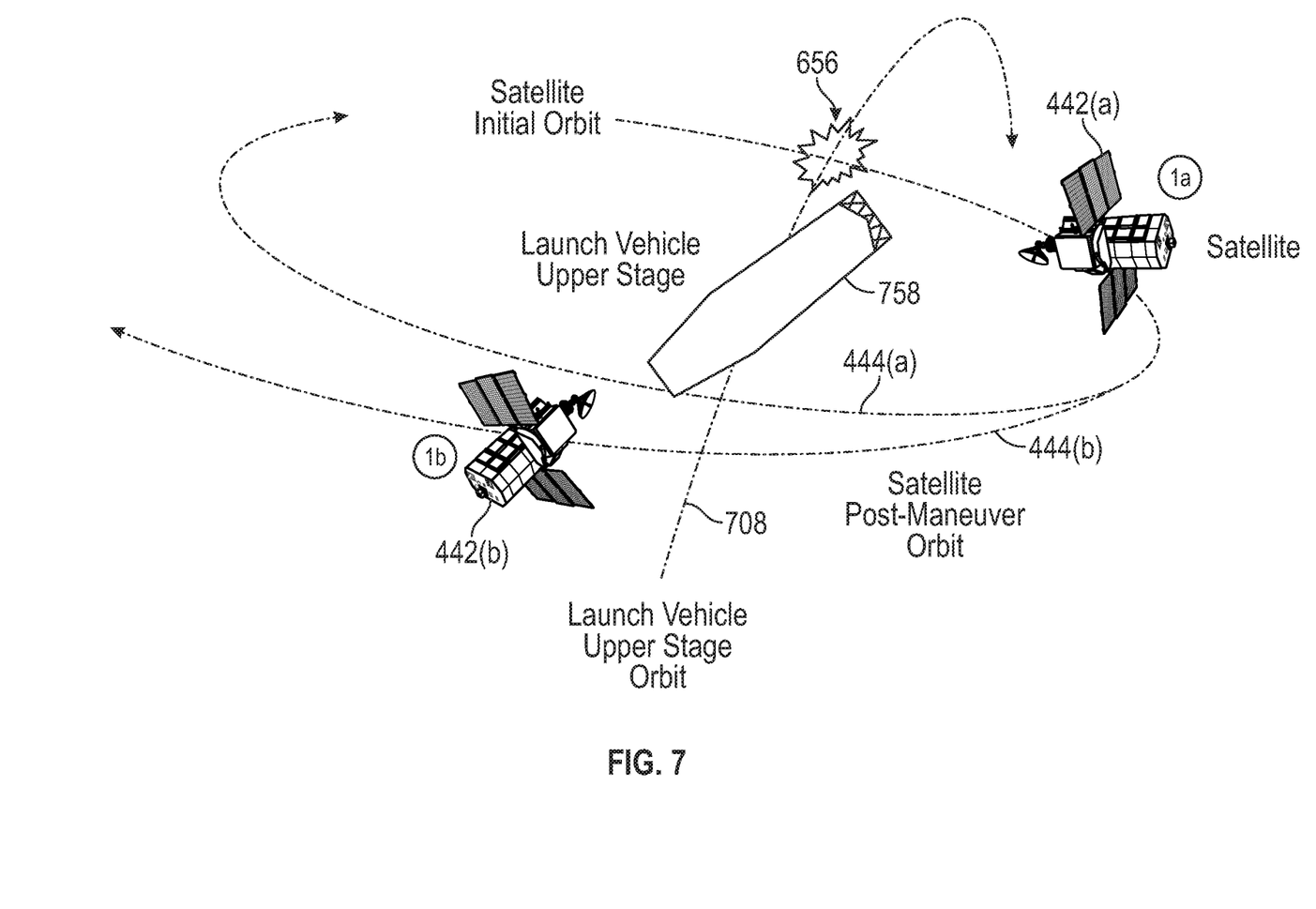
FIG. 7 shows a representation of an example of a launch vehicle and a satellite according to yet another embodiment of the disclosure.

FIG. 7 shows a representation 700 of a launch vehicle having an upper stage portion 758 and a satellite portion 442 according to yet another embodiment of the disclosure. As shown in FIG. 7 there are intersecting orbits with a probable conjunction.

The launch vehicle upper stage 758 deploys satellite (generally 442) which enters initial orbit 444(*a*). The launch vehicle upper stage 758 has an associated launch vehicle upper stage orbit 780. The launch vehicle upper stage orbit 780 has a probable recontact point with the satellite 442, as shown by probable recontact point 656. Thus, the satellite 442 senses the launch vehicle upper stage 758 and the associated orbit 780 and the satellite modifies the initial orbit 444(*a*) to satellite post-maneuver orbit 444(*b*), as shown by satellite position 442(*b*). The position of the satellite 442 at location 442(*b*) in post-maneuver orbit 444(*b*) is no longer in a collision orbit with launch vehicle upper stage 758 since orbit 444(*b*) is modified from initial orbit 444(*a*) to avoid probable reconnect point 656 of launch vehicle 758 in orbit 780. The launch vehicle 758 maintains the trajectory 780.

As shown in FIG. 7 launch vehicle 758 and satellite 442 are in a scenario where a satellite (generally 442) has recently separated from the launch vehicle (LV) upper stage 758. The satellite 442 was launched with a pre-programmed collision avoidance maneuver (CAM) but the separation system malfunctioned, and the actual tipoff trajectory will cause the satellite 442 to recontact the upper stage 780. The operators on the ground have no way of knowing this has occurred. The satellite 442, equipped with SPS, evaluates the probability of collision with the upper stage 758 and autonomously executes a modified CAM thereby avoiding recontact with the upper stage, as described above.

Figure 8:
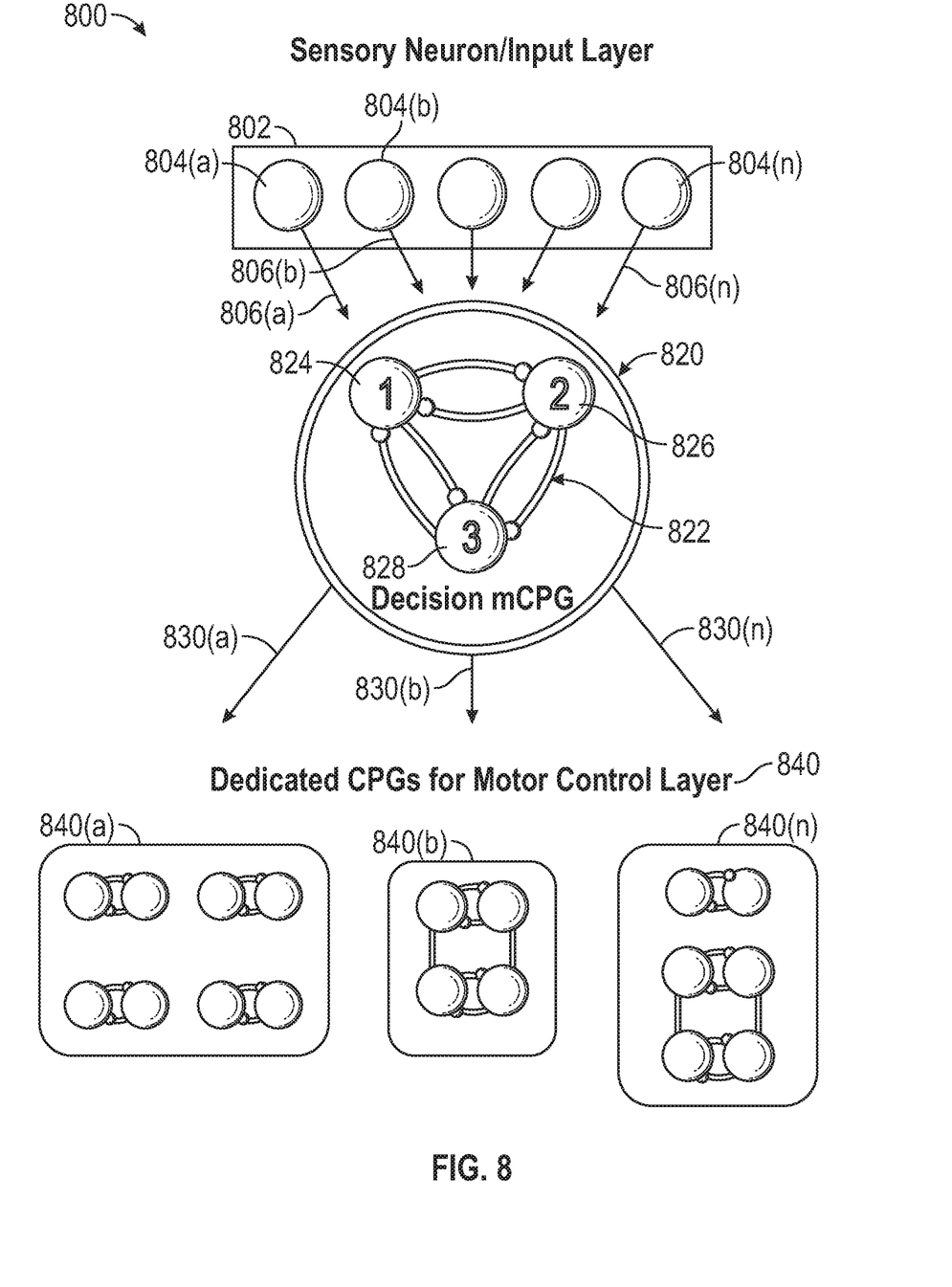
FIG. 8 shows a diagram of input and motor control layers according to an embodiment of the disclosure.

FIG. 8 shows a diagram 800 of input and motor control layers according to an embodiment of the disclosure. As shown in FIG. 8, sensory neuron/input layer 802 includes modules 804(*a*) . . . (*n*), where "n" is any suitable number. Each sensory neuron, generally 804, generates an associated sensory signal 806(*a*) . . . (*n*), where "n" is any suitable number. These sensory signals, generally 806 are provided to decision mCPG layer 820. Decision mCPG layer 820 has three processing nodes 824, 826 and 828. The processing nodes 824, 826 and 828 exchange information and data as shown by 822. The decision mCPG layer 820 outputs signals 830(*a*) . . . (*n*) where "n" is any suitable number to associated dedicated CPGs for motor control layer, shown as 840. The dedicated CPGs for motor control layer include 840(*a*) . . . (*n*).

This disclosure is a biologically inspired control system designed to replicate a basic nervous system of a human. As such the utility can be applied to many other applications outside of spacecraft control. For example, a self-driving car would sense the environment and decide whether the application of steering and brakes or throttle is preferred to avoid a collision. Another example is a robotic service animal that would autonomously transition from walking to climbing or walking to obstacle avoidance. Prosthetics are another example of an application that could benefit from the neuromimetic control system. For instance, a loss of an arm below the elbow would benefit by contacts attached to the lower arm. The neuromimetic control system could provide an interaction between the arm and prosthetic similar to a normal neuronal signal. This could also be applied to any number of systems that require fast feedback-feedforward control decisions.

The embodiments described above and below are representative embodiments of the concepts disclosed herein. All of the representative embodiments are combinable in any combination or permutation with any other representative embodiments and equivalents thereof.

One embodiment is directed to a self-protection system for a spacecraft in orbit comprising: one or more local area situational awareness sensors configured to acquire sensory data relative to a designated region surrounding the spacecraft; a controller including one or more multifunctional central pattern generators (mCPG) circuits configured to receive the sensory data acquired by the one or more local area situational awareness sensors, a data handler circuit and a guidance control circuit, the data handler circuit and guidance control circuit in communication with the mCPG circuits, the controller configured to operatively switch between one or more of the mCPG circuits; one or more navigation sensors configured to acquire navigation data relative to the spacecraft and provide the acquired navigation data to the guidance control circuit and the mCPG circuits, the mCPG circuits generating a related pattern control signal; and one or more actuators configured to receive one or more guidance control signals from the guidance control circuit and one or more pattern control signals from the mCPG circuits to actuate one or more mechanisms of the spacecraft to adjust a position of the spacecraft based at least in part on the received guidance control signals from the guidance control circuit and based at least on a larger part on the pattern control signals from the mCPG circuits.

Another embodiment is directed to the self-protection system for a spacecraft where the one or more pattern control signals interrupt the guidance control signals.

Yet another embodiment is directed to the self-protection system for a spacecraft, further comprising layers of mCPG circuits that generate a plurality of pattern control signals corresponding to an associated layer of mCPG circuits.

Yet another embodiment is directed to the self-protection system for a spacecraft, where the one or more local area situational awareness sensors include one or more of cameras, RADAR devices, LIDAR devices, space weather instruments, gas chromatograph, mass spectrometer, and IR spectrometer.

Yet another embodiment is directed to the self-protection system for a spacecraft, where the one or more mechanisms of the spacecraft include torque rods, reaction wheels, control moment gyroscopes and propulsion devices.

Yet another embodiment is directed to the self-protection system for a spacecraft, where the one or more navigation sensors include global positioning satellites, sun sensors, star trackers and horizon sensors.

Yet another embodiment is directed to the self-protection system for a spacecraft, where the one or more local area situational awareness sensors are configured to acquire sensory data related to a change of environment of the spacecraft.

Yet another embodiment is directed to the self-protection system for a spacecraft, where the one or more pattern control signals temporarily override the one or more guidance control signals.

Yet another embodiment is directed to the self-protection system for a spacecraft, where the one or more pattern control signals from the mCPG circuits are based at least in part on one or more pre-programmed commands that are accessed by one or more of the mCPG circuits.

Yet another embodiment is directed to the self-protection system for a spacecraft, where the guidance control signals from the guidance control circuit are weighted at between 0.0 and 1.0 and one or more pattern control signals from the mCPG circuits are weighted between 0.0 and 1.0 to adjust a position of the spacecraft.

Yet another embodiment is directed to the self-protection system for a spacecraft, where the adjusting a position of the spacecraft includes adjusting an attitude of the spacecraft.

Yet another embodiment is directed to the self-protection system for a spacecraft, where the adjusting a position of the spacecraft includes adjusting the orbit of the spacecraft.

Yet another embodiment is directed to the self-protection system for a spacecraft, where the sensory data relative to a designated region surrounding the spacecraft includes sensing a presence of meteoroids.

Yet another embodiment is directed to a method for controlling a position of a spacecraft in an orbit comprising: establishing a first orbit having a first trajectory for the spacecraft; accessing one or more navigation data control signals; sensing conditions in a region surrounding the spacecraft; accessing one or more CPG-based pattern control signals based on the sensed conditions; generating an adjustment control command signal based in part on each of the one or more CPG-based pattern control signals and the sensed conditions and the navigation data control signals, the adjustment control command signal being weighted by a coefficient biased by the one or more CPG-based pattern control signals; and adjusting the first orbit of the spacecraft based at least in part on the adjustment control command signal.

Yet another embodiment is directed to the method for controlling a position of a spacecraft, further comprising interrupting the guidance control signals with the pattern control signals.

Yet another embodiment is directed to the method for controlling a position of a spacecraft in an orbit, where the guidance control signals from the guidance control circuit are dynamically weighted and one or more pattern control signals from the mCPG circuits are dynamically weighted to adjust a position of the spacecraft.

Yet another embodiment is directed to the method for controlling a position of a spacecraft in an orbit, where the sensing conditions in a region surrounding the spacecraft includes sensing a presence of meteoroids.

Yet another embodiment is directed to the method for controlling a position of a first spacecraft in an orbit relative to a second spacecraft in an orbit comprising: establishing a first orbit having a first trajectory for the first spacecraft; establishing a first orbit having a first trajectory for the second spacecraft; determining a relationship between the first orbit of the first spacecraft and the first orbit of the second spacecraft; determining an alert based on the relationship between the first orbit of the first spacecraft and the first orbit of the second spacecraft; accessing one or more navigation data control signals of the first spacecraft; accessing one or more CPG-based pattern control signals of the first spacecraft; generating an adjustment control command signal for the first spacecraft based in part on each of the one or more CPG-based pattern control signals and the navigation data control signals, the adjustment control command signal being weighted by a coefficient biased by the one or more CPG-based pattern control signals; and adjusting the first orbit of the first spacecraft to a second orbit of the first spacecraft based at least in part on the adjustment control command signal.

Yet another embodiment is directed to the method for controlling a position of a first spacecraft in an orbit relative to a second spacecraft in an orbit, where the guidance control signals from the guidance control circuit are dynamically weighted and one or more pattern control signals from the mCPG circuits are dynamically weighted to adjust a position of the spacecraft.

Yet another embodiment is directed to the method for controlling a position of a first spacecraft in an orbit relative to a second spacecraft in an orbit, where the first spacecraft is a satellite and the second spacecraft is a launch vehicle.

Yet another embodiment is directed to the method for controlling a position of a first spacecraft in an orbit relative to a second spacecraft in an orbit, where performing the generating an adjustment control command signal is independent of a control signal from a terrestrial location.

Yet another embodiment is directed to the method for controlling a position of a first spacecraft in an orbit relative to a second spacecraft in an orbit, where the first spacecraft is a satellite and the second spacecraft is a satellite.

Yet another embodiment is directed to the method for controlling a position of a first spacecraft in an orbit relative to a second spacecraft in an orbit, further comprising: performing the generating an adjustment control command signal at the first spacecraft; and performing the adjusting the first orbit of the first spacecraft at the first spacecraft.

Yet another embodiment is directed to the method for controlling a position of a first spacecraft in an orbit relative to a second spacecraft in an orbit, where the relationship between the first orbit of the first spacecraft and the first orbit of the second spacecraft indicates a probable recontact point.

Yet another embodiment is directed to an apparatus comprising: a first object having an associated path; one or more sensors disposed on the first object, each sensor adapted to sense position data, size data and velocity data of one or more second objects and generate a sensor signal based on the sensed position data, size data and velocity data of the one or more second objects; one or more and multifunctional central pattern generators (mCPG) circuits, operatively coupled to one or more of the one or more sensors and configured to generate object control signals based at least in part of the sensor signal; one or more actuators, operatively coupled to one or more of the one or more multifunctional central pattern generators (mCPG) circuits, and adapted to receive the object control signals, the actuators adapted to affect a modification of the associated path of the first object based on the received object control signals.

Yet another embodiment is directed to the above-described apparatus, where the path is an orbit.

Yet another embodiment is directed to the above-described apparatus where the path is a road.

Yet another embodiment is directed to the above-described apparatus, where the path is movement of a body part.

Those of ordinary skill in the art realize that the following descriptions of the embodiments of the present disclosure are illustrative and are not intended to be limiting in any way. Other embodiments will readily suggest themselves to such skilled persons having the benefit of this disclosure. Like numbers refer to like elements throughout.

Although the detailed description of the disclosure contains many specifics for the purposes of illustration, anyone of ordinary skill in the art will appreciate that many variations and alterations to the following details are within the scope of the disclosure. Accordingly, the following embodiments are set forth without any loss of generality to, and without imposing limitations upon, the claims.

In this detailed description, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present disclosure.

Furthermore, in this detailed description, a person skilled in the art should note that quantitative qualifying terms such as "generally," "substantially," "mostly," "approximately" and other terms are used, in general, to mean that the referred to object, characteristic, or quality constitutes a majority of the subject of the reference. The meaning of any of these terms is dependent upon the context within which it is used, and the meaning may be expressly modified.

Some of the illustrative embodiments of the present disclosure may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments.

While the disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof.

Therefore, it is intended that the disclosure not be limited to the particular embodiment disclosed as the best or only mode contemplated for carrying out this disclosure, but that the disclosure will include all embodiments falling within the scope of the appended claims.

Also, in the drawings and the description, there have been disclosed exemplary embodiments and, although specific terms may have been employed, they are unless otherwise stated used in a generic and descriptive sense only and not for purposes of limitation, the scope of the disclosure therefore not being so limited.

Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the disclosure should be determined by the appended claims and their legal equivalents, and not by the examples given.

The invention claimed is:

1. A self-protection system for a spacecraft in orbit comprising:
   one or more local area situational awareness sensors configured to acquire sensory data relative to a designated region surrounding the spacecraft;
   a controller including one or more multifunctional central pattern generator (mCPG) circuits configured to receive the sensory data acquired by the one or more local area situational awareness sensors, a data handler circuit and a guidance control circuit, the data handler circuit and guidance control circuit in communication with the mCPG circuits, the controller configured to operatively switch between one or more of the mCPG circuits;
   one or more navigation sensors configured to acquire navigation data relative to the spacecraft and provide the acquired navigation data to the guidance control circuit and the mCPG circuits, the mCPG circuits generating a related pattern control signal; and
   one or more actuators configured to receive one or more guidance control signals from the guidance control circuit and one or more pattern control signals from the mCPG circuits to actuate one or more mechanisms of the spacecraft to adjust a position of the spacecraft based at least in part on the received guidance control signals from the guidance control circuit and based at least on a larger part on the pattern control signals from the mCPG circuits.

2. The self-protection system for a spacecraft of claim 1, where the one or more pattern control signals interrupt the guidance control signals.

3. The self-protection system for a spacecraft of claim 1, further comprising layers of mCPG circuits that generate a plurality of pattern control signals corresponding to an associated layer of mCPG circuits.

4. The self-protection system for a spacecraft of claim 1, where the one or more local area situational awareness sensors include one or more of cameras, RADAR devices, LIDAR devices, space weather instruments, gas chromatograph, mass spectrometer, and IR spectrometer.

5. The self-protection system for a spacecraft of claim 1, where the one or more mechanisms of the spacecraft include torque rods, reaction wheels, control moment gyroscopes and propulsion devices.

6. The self-protection system for a spacecraft of claim 1, where the one or more navigation sensors include global positioning satellites, sun sensors, star trackers and horizon sensors.

7. The self-protection system for a spacecraft of claim 1, where the one or more local area situational awareness sensors are configured to acquire sensory data related to a change of environment of the spacecraft.

8. The self-protection system for a spacecraft of claim 1, where the one or more pattern control signals temporarily override the one or more guidance control signals.

9. The self-protection system for a spacecraft of claim 1, where the one or more pattern control signals from the mCPG circuits are based at least in part on one or more pre-programmed commands that are accessed by one or more of the mCPG circuits.

10. The self-protection system for a spacecraft of claim 1, where the guidance control signals from the guidance control circuits and one or more pattern control signals from the mCPG circuits are dynamically weighted, in response to guidance control circuit weights, to adjust a position of the spacecraft.

11. The self-protection system for a spacecraft of claim 1, where the adjusting a position of the spacecraft includes adjusting an attitude of the spacecraft.

12. The self-protection system for a spacecraft of claim 1, where the adjusting a position of the spacecraft includes adjusting the orbit of the spacecraft.

13. The self-protection system for a spacecraft of claim 1, where the sensory data relative to a designated region surrounding the spacecraft includes sensing a presence of meteoroids.

14. A method for controlling a position of a spacecraft in an orbit comprising:
    establishing a first orbit having a first trajectory for the spacecraft;
    accessing one or more navigation data control signals;
    sensing conditions in a region surrounding the spacecraft;
    accessing one or more CPG-based pattern control signals based on the sensed conditions;
    generating an adjustment control command signal based in part on each of the one or more CPG-based pattern control signals and the sensed conditions and the navigation data control signals, the adjustment control command signal being weighted by a coefficient biased by the one or more CPG-based pattern control signals; and
    adjusting the first orbit of the spacecraft based at least in part on the adjustment control command signal.

15. The method for controlling a position of a spacecraft in an orbit of claim 14, further comprising interrupting the guidance control signals with the pattern control signals.

16. The method for controlling a position of a spacecraft in an orbit of claim 14, where the CPG-based pattern control signals are dynamically weighted.

17. The method for controlling a position of a spacecraft in an orbit of claim 14, where the sensing conditions in a region surrounding the spacecraft include sensing a presence of meteoroids.

18. A method for controlling a position of a first spacecraft in an orbit relative to a second spacecraft in an orbit comprising:
    establishing a first orbit having a first trajectory for the first spacecraft;
    establishing a first orbit having a first trajectory for the second spacecraft;
    determining a relationship between the first orbit of the first spacecraft and the first orbit of the second spacecraft;
    determining an alert based on the relationship between the first orbit of the first spacecraft and the first orbit of the second spacecraft;
    accessing one or more navigation data control signals of the first spacecraft;
    accessing one or more CPG-based pattern control signals of the first spacecraft;
    generating an adjustment control command signal for the first spacecraft based in part on each of the one or more CPG-based pattern control signals and the navigation data control signals, the adjustment control command signal being weighted by a coefficient biased by the one or more CPG-based pattern control signals; and
    adjusting the first orbit of the first spacecraft to a second orbit of the first spacecraft based at least in part on the adjustment control command signal.

19. The method for controlling a position of a first spacecraft in an orbit relative to a second spacecraft in an orbit of claim 18, where each of the one or more CPG-based pattern control signals is dynamically weighted.

20. The method for controlling a position of a first spacecraft in an orbit relative to a second spacecraft in an orbit of claim 18, where the first spacecraft is a satellite and the second spacecraft is a launch vehicle.

21. The method for controlling a position of a first spacecraft in an orbit relative to a second spacecraft in an orbit of claim 18, where performing the generating an adjustment control command signal is independent of a control signal from a terrestrial location.

22. The method for controlling a position of a first spacecraft in an orbit relative to a second spacecraft in an orbit of claim 18, where the first spacecraft is a satellite and the second spacecraft is a satellite.

23. The method for controlling a position of a first spacecraft in an orbit relative to a second spacecraft in an orbit of claim 18, further comprising:
    performing the generating an adjustment control command signal at the first spacecraft; and
    performing the adjusting the first orbit of the first spacecraft at the first spacecraft.

24. The method for controlling a position of a first spacecraft in an orbit relative to a second spacecraft in an orbit of claim 18, where the relationship between the first orbit of the first spacecraft and the first orbit of the second spacecraft indicates a probable recontact point.

25. An apparatus comprising:
    a first object having an associated path;
    one or more sensors disposed on the first object, each sensor adapted to sense position data, size data and velocity data of one or more second objects and generate a sensor signal based on the sensed position data, size data and velocity data of the one or more second objects;
    one or more and multifunctional central pattern generator (mCPG) circuits, operatively coupled to one or more of the one or more sensors and configured to generate object control signals based at least in part of the sensor signal; and
    one or more actuators, operatively coupled to one or more of the one or more multifunctional central pattern generator (mCPG) circuits, and adapted to receive the object control signals, the actuators adapted to affect a modification of the associated path of the first object based on the received object control signals.

26. The apparatus of claim 25, where the path is an extraterrestrial orbit.

* * * * *